A. F. CHIESANOVA.
DISMOUNTABLE PETROLEUM OR THE LIKE STOVE.
APPLICATION FILED MAY 27, 1908.
935,639.
Patented Oct. 5, 1909.
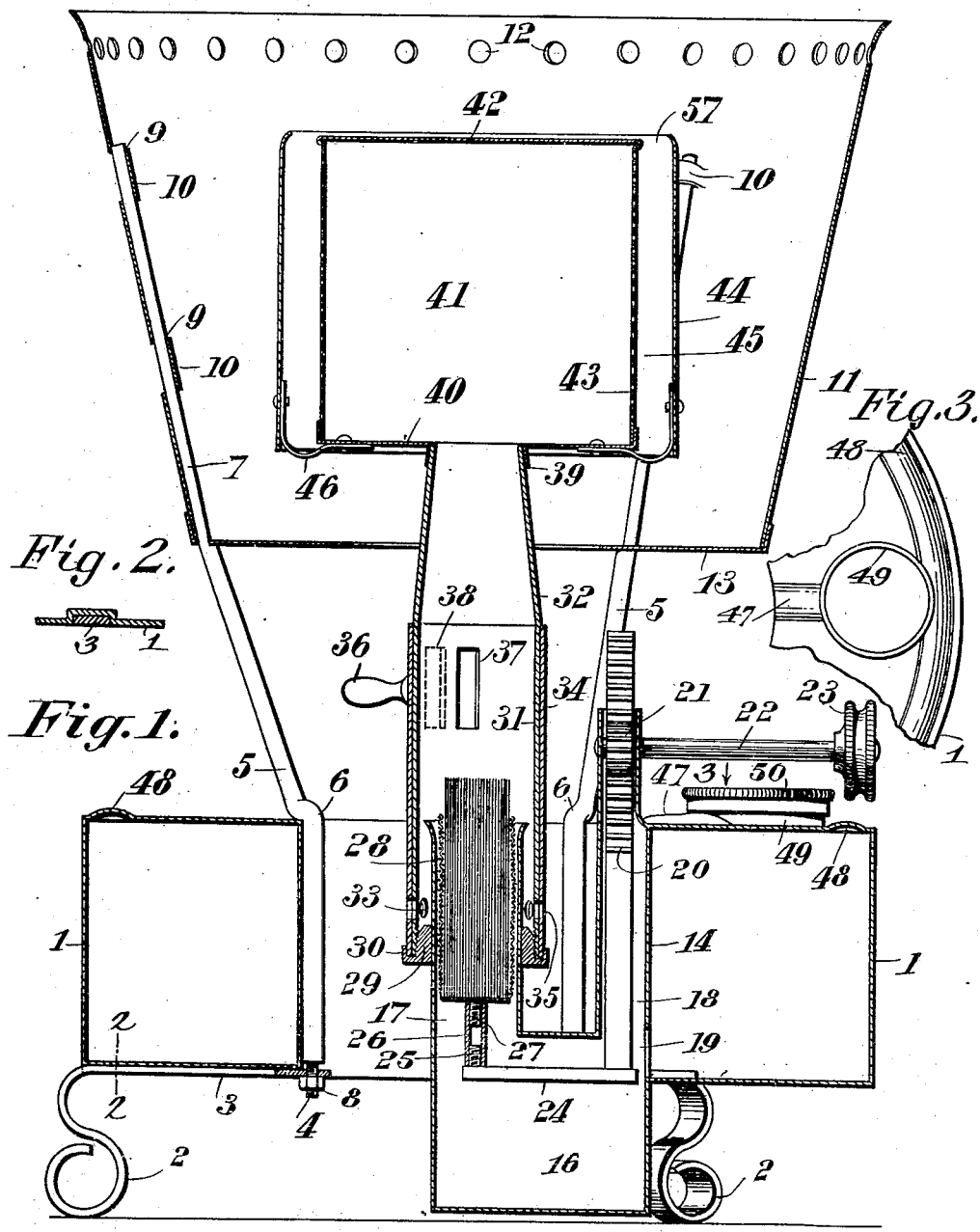

UNITED STATES PATENT OFFICE.

ANGEL FRANCISCO CHIESANOVA, OF BRUSSELS, BELGIUM.

DISMOUNTABLE PETROLEUM OR THE LIKE STOVE.

935,639.  Specification of Letters Patent.  Patented Oct. 5, 1909.

Application filed May 27, 1908. Serial No. 435,228.

*To all whom it may concern:*

Be it known that I, ANGEL FRANCISCO CHIESANOVA, a citizen of Argentina and resident of Brussels, Belgium, have invented certain new and useful Improvements in Dismountable Petroleum or the Like Stoves, of which the following is a specification.

This invention relates to petroleum or the like stoves, its object being to provide a stove of this kind which will be adapted to be extremely easily assembled and disassembled so that the stove will be convenient for use for camping and like purposes.

In the annexed drawings, given by way of example, Figure 1 shows a longitudinal section of the stove. Fig. 2 is a sectional view on line 2—2 of Fig. 1. Fig. 3 is a fragmentary top plan view looking in the direction of arrow 3 of Fig. 1.

The reservoir comprises an annular receptacle 1 supported on three feet 2 the horizontal part 3 of which engages a depression provided in the bottom of the receptacle so that the stability of the feet is ascertained. The end of each foot is provided with an opening into which one engages the screw threaded end 4 of a supporting rod 5 provided with a bent part 6 and a flattened part 7. The bent part 6 bears upon the inner upper border of the receptacle and is held thereupon by the tightening of a nut 8 which is screwed upon the screw threaded end 4. The flat part 7 of each of the rods 5 is engaged into two slots 9 which are obtained by driving out two strips 10 in the sheet metal of the funnel 11 having the form of an upset truncated cone upon which the vessel to be heated is placed. The upper border of the said funnel is provided with a series of holes 12 while at the bottom it is partly closed by an annular bottom 13.

Applied to the inner wall 14 of the reservoir is an auxiliary receptacle formed of a chamber 16 and of two vertical channels 17 and 18. The chamber 16 communicates by an opening 19 with the reservoir 1 while the channel 18 is adapted to receive a vertical toothed rack 20 which meshes with a toothed pinion 21 the shaft 22 of which is provided with a milled disk 23 adapted to actuate the pinion and the said toothed rack. The latter is secured at its lower end to a cross bar 24 provided with a screw threaded stud 25 upon which is screwed a narrow tube 26 the screw threaded upper opening is engaged by the bottom screw 27 of a sort of basket 28 made of wire gauze or of foraminated sheet metal, the wall of which is concentric with that of the vertical channel 17 which has a circular section. Secured to the outer peripherical wall of the tube forming this channel by soldering or otherwise is a screw threaded ring 29 provided with a flange 30. Screwed upon the threads of this ring is a cylindrical tube 31 the upper part 32 of which is conical. The cylindrical part of this tube carries a series of openings 33 adapted to admit the combustion air and surrounded by a movable sleeve 34 carrying the same number of openings 35 as the said cylindrical part 31 and a handle piece 36. Provided in a cylindrical part as well as in the movable sleeve is a rectangular opening or window 37, 38 which may be caused to register when it is desired to introduce a match into the interior of the tube 31. The basket 28 receives the wick proper which is formed by a bundle of iron, bronze or copper wires soldered together at their lower end, of asbestos thread rolled upon a metallic tube, of a stick of pumice stone or of coke carbon or of tissue of vegetable or animal fibers.

Upon the upper end of the tube 32 is frictionally engaged the conically enlarged rim 39 of the bottom 40 of a drum 41 closed at the top by the cover 42 and the wall 43 of which is formed by foraminated sheet metal. The latter is surrounded by a cylindrical casing 44 so that an annular space 45 be formed. The fixation of this casing to the drum 41 is accomplished by flat irons 46.

The reservoir cover is provided with a radial rib 47 which intersects the filling tube 49 and said cover is also provided with a circular rib 48 which is intersected by the filling tube 49 and the latter may be conveniently closed by a plug 50.

When it is desired to use the apparatus, one opens the window 37 by causing it to register with the opening 38. One afterward raises the wick to the height of about 15 millimeters (Fig. 1) and one lights the stove. One then closes the opening 37 and places the sleeve into the position shown by Fig. 1 where the openings 33, 35 for the admission of the combustion air register with each other. Owing to the heat produced by the lighted wick, petroleum or other vopors are evolved which rise in the tube 31, 32 and enter the drum 41 having perforated walls and finally escape through the circular slot 57. These vapors are lighted and a blue flame suitable for heating purposes is obtained.

Having now fully described my said invention, what I claim and desire to secure by Letters Patent, is:—

1. In a liquid fuel stove of the kind described, the combination of an annular reservoir for the liquid fuel provided with a cover, a secondary receptacle disposed adjacent the inner wall of said annular reservoir and communicating therewith, a cooking appliance support, supporting rods movably secured to said support and provided with bends engaging and supported by the inner and upper rim of said annular reservoir, said rods having threaded ends, said annular reservoir having radial depressions in its bottom wall, feet having horizontal portions seated in said depressions and also having openings receiving the threaded ends of said rods, and nuts for securing said rods to said feet.

2. In a liquid fuel stove of the kind described, the combination of an annular reservoir for the liquid fuel provided with a cover having a circular rib and a filling tube intersecting said rib, with a radial rib intersecting said filling tube, a secondary receptacle adjacent the inner wall of said annular reservoir and communicating therewith, a cooking appliance support, supporting rods movably secured to said support and provided with bends engaging the upper inner margin of said annular reservoir and having their lower ends threaded, said reservoir having radial depressions in its bottom wall, feet having horizontal portions seated in said radial depressions and openings for receiving the threaded ends of said rods, and nuts for securing said feet to said rods.

In testimony whereof I have hereunto set my hand in presence of two witnesses.

ANGEL FRANCISCO CHIESANOVA.

Witnesses:
CRAN NELSEN,
GREGORY PHELAN.